United States Patent Office 3,641,168
Patented Feb. 8, 1972

3,641,168
1,3,5-HALOXYLENE EXTRACTION
John D. Bacha, Monroeville, and Charles M. Selwitz, Pitcairn, Pa., assignors to Gulf Research & Development Company, Pittsburgh, Pa.
No Drawing. Continuation-in-part of application Ser. No. 785,798, Dec. 20, 1968. This application Dec. 3, 1969, Ser. No. 881,851
Int. Cl. C07c 25/04
U.S. Cl. 260—650 R                 4 Claims

ABSTRACT OF THE DISCLOSURE

Selective extraction of 1,3,5-chloroxylene from other chloroxylene isomers initially present in a heterogeneous mixture comprising an HF layer relatively rich in 1,3,5-chloroxylene and a contacting organic layer relatively poor in 1,3,5-chloroxylene is effected by heating the heterogeneous mixture to a sufficiently high temperature to ensure that the HF layer is uppermost in the extraction vessel.

In a preferred embodiment, the extraction is conducted in the absence of a diluent.

---

This application is a continuation-in-part of Ser. No. 785,798, filed on Dec. 20, 1968, now U.S. Pat. No. 3,577,470, which issued May 4, 1971.

This invention relates to a method of separating meta orientated haloalkyl benzenes from isomeric mixtures thereof and, more particularly to a method of separating 1,3,5-chloroxylene from a mixture of its six possible isomers.

Haloxylenes can exist in six isomeric forms, but of these the 1,3,5-haloxylene,

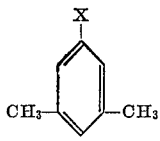

wherein X is halogen, has an appreciable commercial attraction. For example, as shown in U.S. Pat. No. 3,352,927 to De Vries et al., 3,5-xylenol can be used in the preparation of a readily curable extremely attractive formaldehyde-type thermosetting polymer. The 3,5-xylenol required for such polymer can easily be obtained by conventional hydrolysis of 1,3,5-chloroxylene.

As disclosed in our copending application, Ser. No. 785,798, we have found that haloxylenes which do not fit the definition of 1,3,5-haloxylene can be effectively isomerized to 1,3,5-haloxylene by the mere expedient of contacting the same with HF and $BF_3$, preferably in the presence of an orthohalotoluene. By "haloxylenes" we intend to include chloro-, bromo-, fluoro- and iodoxylenes, although the procedure is particularly pertinent to the isomerization of chloroxylenes.

The isomerization reaction defined in said copending application is effectively carried out merely by bringing the haloxylene charge (which can include any one or any combination of non-1,3,5-haloxylenes) in effective contact with HF and $BF_3$. Thus, in a preferred embodiment anhydrous HF is added to a closed reactor containing the haloxylene charge, after which $BF_3$ gas is added thereto. The molar ratio of HF to $BF_3$ used in the isomerization reaction can be from about 100:1 to about 1:1, preferably from about 10:1 to about 2:1. The molar ratio of HF and $BF_3$ (as a combined entity) to the haloxylene charge can be from about 300:1 to about 1:1, preferably in the range of about 50:1 to about 5:1. The contents of the reactor are stirred during the course of the reaction, with the temperature being as low as about 25° C. or as high as about 160° C., but preferably remaining in the range of about 55° to about 95° C. Below about 25° C. the reaction rate is too slow, whereas at temperatures in excess of about 160° C. dehalogenation and the formation of decomposition products and polymers is facilitated. Pressure is not critical and can be as low as about 15 pounds per square inch gauge to as high as about 1200 pounds per square inch gauge, or even higher, but preferably is maintained within a range of about 100 to about 800 pounds per square inch gauge. In effect any pressure sufficient to maintain the HF in the liquid phase can be employed. The reaction time is highly dependent upon the other factors discussed herein and can therefore be varied over a wide range, although, in general, a time of about one minute to about five hours, preferably about 15 minutes to about one hour can be used.

At the end of the reaction period stirring is terminated and a heterogeneous system having three phases is found. As will be discussed in greater detail hereinbelow, the relative positions of the three phases are dependent upon the composition of the charge to the reactor and upon the temperature at which the three phases are maintained. However, when the three phases are maintained at a preferred temperature, e.g., between about 55° to about 95° C., the lower phase is a liquid containing a mixture of haloxylenes (initial isomers and isomers formed during the process) and the disproportionation products, such as halotoluenes and halotrimethylbenzenes. The intermediate layer is also a liquid and consists essentially of HF, $BF_3$ and a mixture of haloxylenes. From about 50 to about 90 percent by weight of the intermediate layer is comprised of a complex of HF, $BF_3$ and the desired 1,3,5-haloxylene isomer, with the remainder made up of any one or combination of other haloxylene isomers and disproportionation products thereof complexed with HF asd $BF_3$. The upper phase is gaseous and under the conditions of the reaction defined herein is composed almost wholly of $BF_3$. Hereinafter, the three phases will be referred to as the organic or chloroaromatic layer, the HF layer, and the $BF_3$ phase, respectively. The intermediate liquid phase, i.e., the HF layer, is withdrawn from the reaction zone and the components therein separated by any suitable procedure such as the following. The HF layer so removed is subjected to distillation under any suitable conditions, for example, a pressure of about five to about 800 pounds per square inch gauge, at a temperature of about 0° to about 180° C. The complex is thus broken and gaseous HF and $BF_3$ is removed overhead. The remaining product can then be further purified to remove any disproportionation products and some of the undesired haloxylene isomers thereof, for example, by distillation, and thereby leave behind the desired 1,3,5-haloxylene or a mixture rich in 1,3,5-haloxylene, which can be converted, as noted, by hydrolysis, for example, to 3,5-xylenol.

Although the above procedure is effective to convert, by isomerization, the haloxylene charge to the desired isomer, 1,3,5-haloxylene, there is also a tendency under certain conditions, for example, at elevated temperatures, for disproportionation to the halotoluenes and halotrimethyl benzenes. This means the loss of two molecules of the haloxylene charge to undesired compounds, and, to the extent this occurs, production of 1,3,5-haloxylene is thereby reduced. To the extent disproportionation is inhibited, the haloxylenes that are not converted to disproportionation products are thus available for isomerization to desired 1,3,5-xylene. By conducting the isomerization reaction in the added presence of a halotoluene there is about 70 to about 98 percent reduction in the amount of haloxylene converted to disproportionation products over the amount that would be so converted in its absence.

As disclosed in said copending application, the undesired disproportionation of haloxylene charge can be severely inhibited by conducting the isomerization reaction in the additional presence of ortho-halotoluene. By "halotoluene" we mean to include chloro-, bromo-, fluoro- and iodotoluenes, although ortho-chlorotoluene is preferred. When an ortho-halotoluene is also employed herein the halogen on the toluene ring must be identical to the halogen on the haloxylene charge. The molar ratio of present in the charge, it will also be present in the product, if not in its initial form it will be present in one of its isomeric forms. As noted previously the halotoluene will be formed primarily in the lower liquid phase.

The isomerization process defined in our copending application can further be illustrated by the following. A series of runs was made wherein chlorotoluene and chloroxylene or chloroxylene alone were placed in a 300 milliliter stainless steel autoclave equipped with a stirrer, an internal cooling coil and an external heating mantle. After cooling to less than 0° C., anhydrous HF was condensed into the reactor and BF₃ was pressured therein. Heat was applied to the stirred reactor until the indicated temperature was reached and that temperature was maintained for the indicated time. The pressure that developed within the reactor at the indicated temperature is recorded. The reactor was then cooled to less than 0° C. and the product withdrawn by way of a bottom drain onto cracked ice in a polyethylene vessel. The resulting aqueous HF, chloroaromatic mixture was extracted at least twice with aliquots of light hydrocarbon (hexane), the extracts combined and washed free of acid with water, two percent aqueous sodium bicarbonate and water again and finally dried over sodium sulfate. This hydrocarbon solution of chloroaromatic products was analyzed by gas chromatography employing an 80' × 1/8" stainless steel column packed with 15 percent p-azoxyanisole on acid washed, 30/60 mesh chromosorb W and a 10' × 1/8" stainless steel column packed with 20 percent FFAP on acid washed, DMCS treated, 70/80 mesh chromosorb W, both operated at 120° C. The results obtained are tabulated below in Tables I and II.

TABLE I

| Run No. | Charge (mol) CX¹ | CT | HF | BF₃ | Molar ratios BF₃/CX | CT/CX | HF/CX | BF₃/CX | Product distribution, mol percent CB | CX | CT² | CT⁸ | CTMB⁹ | CX lost to disproportionation, mol percent | Temp., °C. | Pressure, p.s.i. | Time, hrs. | CX isomer distribution, mol percent 1,2,6- | 1,2,5- | 1,2,4- | 1,3,5- | 1,2,3- | 1,3,4- |
|---|---|---|---|---|---|---|---|---|---|---|---|---|---|---|---|---|---|---|---|---|---|---|---|
| 1 | 0.0854 | ² 0.343 | 2.66 | 0.522 | 6.10 | ⁴ 4.02 | 31.2 | 6.10 | 2.2 | 19.6 | 75.0 | 1.6 | 1.6 | 14.0 | 85 | 580 | 1.0 | 11.7 | 29.6 | 25.7 | 21.8 | 4.9 | 6.3 |
| 2 | 0.0712 | ² 0.286 | 2.19 | 0.488 | 6.85 | 4.02 | 30.7 | 6.85 | 0.9 | 17.0 | 80.7 | 0.7 | 0.7 | 7.6 | 85 | 560 | 1.0 | 12.9 | 32.2 | 25.6 | 17.9 | 5.2 | 6.3 |
| 3 | 0.0712 | ⁴ 0.286 | 2.27 | 0.476 | 6.70 | 4.02 | 31.9 | 6.70 | 0.4 | 18.5 | 80.9 | 0.1 | 0.1 | 1.2 | 85 | 580 | 1.0 | 13.0 | 30.2 | 26.3 | 19.9 | 5.1 | 5.4 |
| 4 | 0.0854 | ⁵ 0.343 | 2.68 | 0.507 | 5.94 | 4.02 | 31.4 | 5.94 | 0.1 | 17.3 | 80.4 | 0.1 | 0.1 | 1.2 | 85 | 590 | 1.0 | 12.7 | 30.3 | 26.2 | 20.4 | 5.1 | 5.4 |
| 5 | 0.0854 | ⁶ 0.347 | 2.57 | 0.550 | 6.40 | 4.06 | 30.1 | 6.40 | 0.1 | 18.9 | 82.4 | 0.05 | 0.05 | 1.2 | 85 | 640 | 2.0 | 10.0 | 35.8 | 21.1 | 20.4 | 4.3 | 5.4 |
| 6 | 0.0854 | ⁶ 0.173 | 2.73 | 0.554 | 6.50 | ⁷ 2.03 | 32.0 | 6.50 | 79.0 | 0 | 0 | 2.3 | 2.3 | 4.1 | 85 | 600 | 2.0 | 6.4 | 24.8 | 24.8 | 24.8 | 3.5 | 4.3 |
| 7 | 0.0896 | 0 | 2.57 | 0.260 | 2.90 | | 28.7 | 2.90 | 66.4 | 0 | 0 | 6.5 | 6.5 | 24.0 | 85 | 600 | 2.0 | 6.4 | 18.8 | 21.1 | 49.0 | 4.8 | 4.1 |
| 8 | 0.0896 | ⁵ 0.160 | 2.56 | 0.304 | 3.40 | 1.78 | 28.5 | 3.40 | 0.1 | 48.0 | 66.8 | 26.0 | 26.0 | 52.0 | 85 | 260 | 2.0 | 14.2 | 33.1 | 25.7 | 21.2 | 4.8 | 4.1 |
| 9 | 0.0896 | ⁵ 0.160 | 2.61 | 0.285 | 3.18 | 1.78 | 29.1 | 3.18 | 0.5 | 28.7 | 66.7 | 0.4 | 0.4 | 2.5 | 85 | 330 | 2.0 | 14.2 | 41.2 | 26.9 | 10.3 | 4.7 | 4.1 |
| 10 | 0.0853 | ⁵ 0.172 | 2.65 | 0.525 | 6.15 | 2.01 | 31.0 | 6.15 | 1.4 | 26.8 | 66.4 | 2.7 | 2.7 | 13.8 | 85 | 350 | 2.0 | 10.9 | 26.6 | 25.4 | 35.9 | 5.2 | 6.7 |
| 11 | 0.0854 | ⁵ 0.343 | 2.61 | 0.567 | 6.65 | 4.02 | 30.5 | 6.65 | 0.3 | 18.1 | 81.0 | 0.3 | 0.3 | 3.3 | 85 | 610 | 2.0 | 11.2 | 27.3 | 25.5 | 25.4 | 4.8 | 5.5 |

¹ = Chloro-p-xylene (1,2,5-CX). ² = p-Chlorotoluene. ³ = m-Chlorotoluene. ⁴ = Chlorotoluene mixture, molar ratio:o/m/63/p:30/7. ⁵ = o-Chlorotoluene. ⁶ = Chlorobenzene (CB). ⁷ = CB/CX. ⁸ = Chlorotoluene. ⁹ = Chlorotoluene or chlorotrimethylbenzene formed from disproportionation.

TABLE II

| Run No. | Charge (mol) CX¹ | CT | HF | BF₃ | Molar ratios BF₃/CX | CT/CX | HF/CX | BF₃/CX | Product distribution, mol percent CB | CX | CT² | CT³ | CTMB³ | CX lost to disproportionation, mol percent | Temp., °C. | Pressure, p.s.i. | Time, hrs. | CX isomer distribution, mol percent 1,2,6- | 1,2,5- | 1,2,4- | 1,3,5- | 1,2,3- | 1,3,4- |
|---|---|---|---|---|---|---|---|---|---|---|---|---|---|---|---|---|---|---|---|---|---|---|---|
| 12 | 0.0576 | 0.237 | 1.72 | 0.344 | 5.97 | 4.11 | 30.0 | 5.97 | 1.0 | 18.5 | 80.1 | 0.2 | 0.2 | 2.1 | 85 | 560 | 1.0 | 10.5 | 26.5 | 24.0 | 25.6 | 6.5 | 7.9 |
| 13 | 0.0612 | 0.235 | 1.88 | 0.374 | 6.12 | 3.84 | 30.7 | 6.12 | 1.9 | 20.9 | 75.8 | 0.7 | 0.7 | 6.3 | 83 | 600 | 2.0 | 9.6 | 25.2 | 23.0 | 26.6 | 5.7 | 9.9 |
| 14 | 0.0570 | 0.237 | 2.27 | 0.384 | 6.74 | 4.16 | 33.7 | 6.74 | 0.5 | 18.5 | 80.0 | 0.5 | 0.5 | 5.1 | 65 | 510 | 2.0 | 10.9 | 26.4 | 24.0 | 27.5 | 5.1 | 6.1 |
| 15 | 0.0570 | 0.238 | 2.77 | 0.435 | 7.63 | 4.17 | 48.6 | 7.63 | 0.4 | 18.5 | 79.7 | 0.7 | 0.7 | 7.0 | 65 | 480 | 2.0 | 10.9 | 24.0 | 21.8 | 34.3 | 4.9 | 5.4 |
| 16 | 0.0292 | 0.115 | 2.87 | 0.432 | 14.8 | 3.92 | 98.3 | 14.8 | 1.4 | 20.4 | 76.3 | 0.7 | 0.7 | 6.4 | 65 | 500 | 2.0 | 5.7 | 23.7 | 13.4 | 58.1 | 4.3 | 4.7 |
| 17 | 0.0284 | 0.118 | 2.93 | 0.594 | 20.9 | 4.15 | 103.2 | 20.9 | 4.7 | 19.7 | 78.3 | 0.4 | 0.4 | 6.4 | 85 | 650 | 2.0 | 4.8 | 15.0 | 11.2 | 65.1 | 3.3 | 3.2 |
| 18 | 0.0150 | ⁵ 0.0597 | 3.05 | 0.534 | 35.6 | 4.00 | 203.0 | 35.6 | 2.5 | 24.9 | 69.1 | 0.8 | 0.8 | 8.9 | 85 | 650 | 2.0 | 2.5 | 8.3 | 5.2 | 81.6 | 2.4 | 3.2 |
| 19 | 0.0150 | ⁵ 0.0597 | 3.15 | 0.466 | 31.1 | 4.00 | 210.0 | 31.1 | 8.4 | 24.1 | 63.7 | 0.8 | 0.8 | 6.8 | 85 | 550 | 2.0 | 3.1 | 8.9 | 6.8 | 78.1 | 2.1 | 2.2 |
| 20 | 0.0150 | ⁵ 0.0597 | 3.18 | 0.420 | 28.0 | 4.00 | 212.0 | 28.0 | 4.1 | 19.4 | 63.9 | 1.9 | 1.9 | 13.6 | 85 | 410 | 2.0 | 7.7 | 18.2 | 14.0 | 55.3 | 2.8 | 5.2 |
| 21 | 0.0150 | ⁵ 0.0597 | 3.04 | 0.174 | 11.0 | 4.00 | 203.0 | 11.0 | 0.3 | 19.4 | 79.2 | 0.3 | 0.3 | 3.0 | 65 | 190 | 2.0 | 11.9 | 28.2 | 22.4 | 28.3 | 4.9 | 4.3 |

¹ = Ortho-chlorotoluene. ² = Chlorotoluene charged. ³ = Chlorotoluene or chlorotrimethylbenzene from disproportionation.

halotoluene to haloxylene can be from 0.5:1 to about 10:1, preferably from about 2:1 to about 5:1, but best results are obtained when the molar ratios are about 4:1. The composition of the three phases at the termination of the isomerization reaction, insofar as compounds present are concerned, will not be changed because an ortho-halotoluene has been employed. In the absence of a halotoluene in the charge, a halotoluene will still be present in the reaction mixture because of the defined disproportionation. When a halotoluene is also The data in the above tables clearly illustrate the advantages of operation in accordance with the defined procedure. For example, a comparison between Runs Nos. 1 to 4 indicate that ortho-chlorotoluene itself or a mixture rich in ortho-chlorotoluene is effective in controlling disproportionation of chloroxylene whereas para- or meta-chlorotoluene is not as effective for such purposes. Similarly Runs Nos. 5 and 6 show that chlorobenzene does not control the disproportionation of chloroxylene with the same effectiveness exhibited by ortho-chlorotoluene. The tables also show that chloroxylene loss to disproportionation is equal to the sum of chlorotoluene and chlorotrimethylbenzene formed from disproportionation divided by the same sum plus the chloroxylene left in the product ($CT^9+CTMB^9/CT^9+CTMB^9+CX$). The effect of increasing amounts of ortho-chlorotoluene on isomerization and disproportionation in parallel sets of experiments is demonstrated at 65° and 95° C. in Runs Nos. 7 to 11. The effect of time on isomerization and disproportionation is revealed by comparison of Runs Nos. 4 and 11. The influence of large changes in HF and/or $BF_3$ proportions at 65° or 85° C. on the over-all distribution of chloroxylenes, especially 1,3,5-chloroxylene, is described in Runs Nos. 12 to 21.

As indicated above, the positions of the HF layer and organic layer in contact therewith are dependent upon the temperature of the contacting layers in the heterogeneous system as well as on the composition of the charge to the reactor. In this regard, we have now discovered that the temperature-position relationship exhibited by the HF and organic layers is critical in determining the distribution of 1,3,5 - chloroxylene therebetween. In other words, we have discovered that the selectivity with which 1,3,5-chloroxylene can be extracted to the HF layer in a mixture containing 1,3,5-chloroxylene, other chloroxylenes, HF and $BF_3$, can be greatly improved by controlling the extraction temperature so as to control the respective positions of the HF and organic layers during extraction. In this regard, we have found that it is preferred to conduct the herein described extraction in the absence of a diluent and at a temperature sufficiently high to ensure that the HF layer is the upper liquid layer in the reactor.

The selective extraction of 1,3,5-chloroxylene in accordance with the present invention can be illustrated by the following. A series of runs was made wherein ortho-chlorotoluene and a six isomer chloroxylene mixture were placed in a 300 milliliter stainless steel autoclave equipped with a stirrer, and internal cooling coil and an external heating mantle. After cooling to less than 0° C., anhydrous HF was condensed into the reactor and $BF_3$ was introduced therein. Stirring was initiated and the contents of the reactor were heated to a temperature between about 0° C. and 150° C., preferably between about 10° C. and 100° C. The pressure within the reactor was recorded. The stirring and heating were continued for about 0.1 to about 0.5 hour, whereafter the contents of the reactor were permitted to stand at the indicated temperature for about 0.1 to about 1.0 hour to effect stratification of the resultant organic and HF layers. The layers were then withdrawn via a bottom drain onto cracked ice in separate polyethylene vessels. The resulting HF mixture was extracted and the extracts washed in the manner previously described.

Alternatively, runs were conducted employing a charge free from chlorotoluene, while still other runs employed hexane as part of the original charge. In addition, several extractions were performed following a one hour, 85° C. isomerization of 1,2,5-chloroxylene. The results obtained are tabulated below in Tables III and IV.

It should be appreciated that the above-described examples relate to laboratory techniques, and that the various manipulative steps are intended to facilitate the handling of materials on a laboratory scale. Accordingly, while the organic and HF layers are described as being drained onto ice in separate containers, it should be appreciated that larger scale operations would employ more commercially feasible techniques. Thus, the layers would be withdrawn separately into suitable dry vessels whereafter the components thereof would be physically separated, for example, by distillation.

TABLE III.—1,3,5-CHLOROXYLENE EXTRACTION

| Run No. | Charge, mols. | | | | | Molar ratios | | | Extraction | | Layer c | Chloroaromatic distribution between layers | | Chloroxylene isomer distribution | | | | | |
|---|---|---|---|---|---|---|---|---|---|---|---|---|---|---|---|---|---|---|---|
| | CX a | CT b | HF | $BF_3$ | Hexane | CT/CX | HF/CX | $BF_3$/CX | Type a | Temp., °C. | Pressure, p.s.i.g. | | CT | CX | 126- | 125- | 124- | 135- | 123- | 134- |
| 22 | 0.0726 | 0.0 | 1.42 | 0.397 | 0.15 | 0.0 | 19.5 | 5.46 | A | −20 | 240 | Extract | 0 | 25.5 | 4.2 | 14.4 | 7.9 | 67.6 | 3.5 | 2.4 |
| | | | | | | | | | | | | Raffinate | 0 | 74.5 | 14.3 | 34.4 | 33.9 | 8.7 | 5.5 | 8.2 |
| 23 | 0.0726 | 0.0 | 2.28 | 0.208 | 0.15 | 0.0 | 31.4 | 2.87 | A | −20 | 100 | Extract | 0 | 21.7 | 2.6 | 10.0 | 5.2 | 78.0 | 2.6 | 1.6 |
| | | | | | | | | | | | | Raffinate | 0 | 78.3 | 13.6 | 34.2 | 33.2 | 5.7 | 5.4 | 7.9 |
| 24 | 0.0726 | 0.0 | 1.62 | 0.239 | 0.15 | 0.0 | 22.3 | 3.29 | A | 3 | 150 | Extract | 0 | 21.5 | 3.1 | 8.3 | 3.4 | 82.2 | 1.9 | 1.1 |
| | | | | | | | | | | | | Raffinate | 0 | 78.5 | 13.6 | 34.7 | 32.7 | 5.7 | 5.3 | 8.0 |
| 25 | 0.0726 | 0.0 | 1.54 | 0.128 | 0.15 | 0.0 | 21.2 | 1.76 | A | 20 | 90 | Extract | 0 | 16.5 | 2.5 | 8.0 | 6.1 | 80.4 | 1.6 | 1.5 |
| | | | | | | | | | | | | Raffinate | 0 | 83.5 | 12.9 | 33.4 | 31.8 | 9.4 | 5.4 | 7.0 |
| 26 | 0.0726 | 0.0 | 1.70 | 0.248 | 0.15 | 0.0 | 23.4 | 3.42 | A | 60 | 260 | Extract | 0 | 20.0 | 2.5 | 7.8 | 5.8 | 80.8 | 2.0 | 1.5 |
| | | | | | | | | | | | | Raffinate | 0 | 80.0 | 13.1 | 33.6 | 31.3 | 9.0 | 5.5 | 7.0 |
| 27 | 0.0725 | 0.169 | 1.37 | 0.260 | 0.15 | 2.3 | 18.9 | 3.59 | A | 18 | 180 | Extract | 3.2 | 24.6 | 2.4 | 7.7 | 4.9 | 81.7 | 2.1 | 1.2 |
| | | | | | | | | | | | | Raffinate | 96.8 | 75.4 | 13.7 | 35.1 | 33.4 | 9.0 | 5.7 | .3 |
| 28 | 0.0725 | 0.168 | 1.79 | 0.268 | 0.15 | 2.3 | 24.6 | 3.69 | A | 19 | 180 | Extract | 2.5 | 23.3 | 2.2 | 7.2 | 3.3 | 85.1 | 2.7 | 0.5 |
| | | | | | | | | | | | | Raffinate | 97.5 | 76.7 | 13.9 | 35.4 | 34.1 | 3.4 | 5.5 | 7.7 |
| 29 | 0.0725 | 0.292 | 2.29 | 0.463 | 0.038 | 4.0 | 31.5 | 6.38 | A | 22 | 295 | Extract | 2.6 | 28.3 | 3.3 | 12.8 | 4.9 | 74.5 | 3.0 | 8.6 |
| | | | | | | | | | | | | Raffinate | 97.4 | 74.3 | 13.9 | 35.2 | 34.9 | 2.0 | 4.4 | 6.9 |
| 30 | 0.0726 | 0.192 | 1.38 | 0.317 | 0.0 | 4.2 | 30.2 | 6.95 | A | 22 | 230 | Extract | 3.3 | 25.7 | 2.9 | 10.4 | 5.0 | 78.4 | 4.9 | 0.9 |
| | | | | | | | | | | | | Raffinate | 96.3 | 74.3 | 13.9 | 36.0 | 35.2 | 2.1 | 2.4 | 1.7 |
| 31 | 0.0456 | 0.343 | 2.71 | 0.475 | 0.088 | 4.0 | 31.7 | 5.57 | B | −9 | 190 | Extract | 2.9 | 31.7 | 4.6 | 17.5 | 5.6 | 66.3 | 4.0 | 8.7 |
| | | | | | | | | | | | | Raffinate | 97.1 | 68.3 | 15.0 | 33.7 | 35.4 | 1.2 | 6.5 | 8.0 |
| 32 | 0.0854 | 0.343 | 2.48 | 0.550 | 0.0 | 4.0 | 29.1 | 6.44 | B | −12 | 215 | Extract | 3.6 | 36.1 | 15.8 | 25.9 | 8.1 | 51.4 | 6.1 | 6.6 |
| | | | | | | | | | | | | Raffinate | 96.4 | 63.9 | 15.3 | 34.3 | 36.7 | 1.5 | 7.1 | 6.3 |
| 33 | 0.0854 | 0.343 | 2.67 | 0.509 | 0.0 | 4.0 | 31.3 | 5.96 | B | 26 | 330 | Extract | 2.8 | 27.2 | 3.5 | 36.1 | 33.8 | 1.4 | 2.7 | 6.1 |
| | | | | | | | | | | | | Raffinate | 95.3 | 78.7 | 12.6 | 33.9 | 30.9 | 75.3 | 6.0 | 0.8 |
| 34 | 0.0854 | 0.343 | 2.79 | 0.525 | 0.0 | 4.0 | 32.6 | 6.15 | B | 80 | 560 | Extract | 4.7 | 21.3 | 1.4 | 4.7 | — | 89.4 | 0.9 | 0.9 | a Type A extractions employ a chloroxylene mixture, 126-/125-/124-/135-/123-/134- CX: 11/29/26/23/5/6/ mole percent. Type B extractions follow a 1 hr., 85° C. isomerization of 125-CX charge; CX isomer distribution after isomerization same as in Type A runs.
b Run 23 employs a chlorotoluene mixture, o/m/p: 51/36/13; others employ ortho-chlorotoluene.
c First layer listed is lowest in reactor and first to be removed via bottom drain.
NOTE.—CX = chloroxylene. CT = chlorotoluene.

TABLE IV.—VARIATION OF LAYER INVERSION TEMPERATURE WITH CHLOROAROMATIC COMPOSITION

| Run No. | Charge, mols | | | | Molar ratios | | | Extraction | | | Layer [e] | Chloroaromatic distribution within a layer | | | | | Chloroxylene isomer distribution | | | | | |
|---|---|---|---|---|---|---|---|---|---|---|---|---|---|---|---|---|---|---|---|---|---|---|
| | CX [a] | CT [b] | HF | BF$_3$ | CT/CX | HF/CX | BF$_3$/CX | Temp., °C | Pressure, p.s.i.g. | | | CB [d] | CT | CX | CTMB [d] | 128- | 125- | 124- | 135- | 123- | 134- |
| 35 [c] | 0.0854 | 0.343 | 2.68 | 0.540 | 4.0 | 31.4 | 6.32 | 28 | 360 | | Raffinate | 0.2 | 86.5 | 13.2 | <0.1 | 15.2 | 38.5 | 33.2 | 1.4 | 5.6 | 6.1 |
| | | | | | | | | 20 | 320 | | do | 0.1 | 85.0 | 14.8 | 0.1 | 14.3 | 36.0 | 33.7 | 4.8 | 4.7 | 6.5 |
| | | | | | | | | 15 | 290 | | Extract | <0.1 | 63.2 | 36.2 | 0.6 | 6.8 | 21.1 | 7.6 | 53.8 | 4.1 | 1.9 |
| | | | | | | | | 10 | 270 | | do | <0.1 | 39.0 | 59.0 | 2.0 | 4.5 | 17.2 | 12.4 | 64.1 | 4.3 | 0.8 |
| | | | | | | | | 5 | 245 | | do | <0.1 | 32.8 | 65.1 | 2.1 | 4.5 | 19.4 | 6.3 | 65.6 | 3.4 | 0.8 |
| | | | | | | | | 0 | 225 | | do | 0.6 | 27.1 | 70.0 | 2.3 | 6.1 | 19.4 | 6.1 | 60.4 | 4.5 | 1.3 |
| | | | | | | | | 0 | 500 | | Raffinate | 0.1 | 80.2 | 19.7 | 0.03 | 16.1 | 34.3 | 35.8 | 0.8 | 5.9 | 7.1 |
| | | | | | | | | 60 | 420 | | do | 0.6 | 78.5 | 21.4 | 0.1 | 14.2 | 35.2 | 29.0 | 5.3 | 6.1 | 6.8 |
| | | | | | | | | 40 | 370 | | do | <0.1 | 79.6 | 20.2 | <0.1 | 15.1 | 35.2 | 33.5 | 3.3 | 6.1 | 6.9 |
| 36 [c] | 0.0940 | 0.235 | 2.91 | 0.550 | 2.5 | 31.0 | 5.85 | 30 | 345 | | Raffinate | 0.2 | 80.6 | 19.0 | 0.1 | 15.5 | 35.2 | 34.8 | 2.4 | 6.0 | 6.0 |
| | | | | | | | | 25 | 320 | | do | 0.3 | 55.2 | 42.3 | 2.4 | 15.5 | 35.1 | 34.4 | 1.8 | 6.0 | 7.0 |
| | | | | | | | | 20 | 275 | | Extract | 0.2 | 28.8 | 66.9 | 4.5 | 6.8 | 18.2 | 12.6 | 55.8 | 4.3 | 2.4 |
| | | | | | | | | 10 | 275 | | do | 0.1 | 81.7 | 18.2 | 4.1 | 4.5 | 15.0 | 6.6 | 69.7 | 3.5 | 0.9 |
| | | | | | | | | 60 | 490 | | Raffinate | 0.1 | 75.5 | 24.0 | <0.05 | 15.3 | 33.6 | 35.0 | 4.0 | 5.7 | 6.7 |
| 37 [c] | 0.160 | 0.400 | 2.42 | 0.497 | 2.5 | 15.1 | 3.10 | 60 | 400 | | do | <0.1 | 73.5 | 26.4 | <0.1 | 15.1 | 40.8 | 30.0 | 2.7 | 5.8 | 4.5 |
| | | | | | | | | 40 | 360 | | do | 0.1 | 75.8 | 24.0 | 0.1 | 15.6 | 39.7 | 31.4 | 4.0 | 5.5 | 4.8 |
| | | | | | | | | 31 | 330 | | do | 0.2 | 74.2 | 25.6 | 0.2 | 16.1 | 39.4 | 31.9 | 2.0 | 5.8 | 4.7 |
| | | | | | | | | 26 | 310 | | Extract | 0.1 | 48.4 | 49.1 | 2.5 | 14.7 | 37.8 | 30.0 | 6.8 | 6.0 | 4.7 |
| | | | | | | | | 20 | 270 | | do | 0.1 | 24.9 | 70.9 | 4.1 | 7.4 | 21.2 | 12.3 | 53.6 | 3.5 | 2.0 |
| | | | | | | | | 10 | 270 | | do | | 23.2 | 70.5 | 4.1 | 5.1 | 18.5 | 6.5 | 65.0 | 3.8 | 1.1 |
| 38 [c] | 0.171 | 0.172 | 2.70 | 0.520 | 1.0 | 15.8 | 3.04 | 0 | 270 | | Raffinate | 0.1 | 73.3 | 26.6 | 0.1 | 16.3 | 38.6 | 32.5 | 6.2 | 4.9 | 4.9 |
| | | | | | | | | 84 | 590 | | do | 0.4 | 54.9 | 44.1 | 0.6 | 14.1 | 35.3 | 29.1 | 9.3 | 6.3 | 6.6 |
| | | | | | | | | 56 | 460 | | do | 0.2 | 59.5 | 39.6 | 0.6 | 15.1 | 33.6 | 31.8 | 9.3 | 6.3 | 4.1 |
| | | | | | | | | 39 | 380 | | Extract | 0.4 | 22.4 | 49.3 | 13.8 | 6.2 | 22.5 | 19.2 | 43.8 | 4.5 | 1.5 |
| | | | | | | | | 27 | 325 | | do | 0.6 | 23.6 | 63.2 | 6.7 | 3.7 | 11.5 | 6.6 | 74.2 | 2.5 | 1.5 |
| | | | | | | | | 27 | 325 | | Raffinate | 0.2 | 61.5 | 37.9 | 0.4 | 15.5 | 34.9 | 33.1 | 3.7 | 6.0 | 6.8 |

[a] Sampling of layers follows 85° C., 1 hour isomerization of initially charged 125-chloroxylene; thus sampling is performed on a chloroxylene mixture with a 12/30/26/22/5/5 isomer distribution (126-/125-/124-/135-/123-/134-CX).
[b] Ortho-chlorotoluene.
[c] All but final sample in each run is that of lowest layer in the reactor; final sample is that of second liquid layer.
[d] CB and CTMB formed during isomerization.
[e] Estimated inversion temperatures: Run 35, 17±3° C.; 36, 23±2° C.; 37, 26±2° C.; 38, 40±4° C.
NOTE.—CX=chloroxylene. CT=chlorotoluene. CB=chlorobenzene. CTMB=chlorotrimethylbenzene.

In practice, the success of the extraction is dependent upon the selective formation of a 1,3,5-chloroxylene·HF·BF$_3$ complex and/or the selective removal of this complex to the HF layer. Successful extraction also hinges upon a sufficient distinction between the resultant organic and HF layers to facilitate their separation. From an examination of the relative differences between the densities of liquid HF, chlorotoluene and chloroxylene (1.002 g./cc. at 0° C., 1.007 g./cc. at 20° C. and 1.006 g./cc. at 20° C., respectively), it was believed that the necessary distinction might not exist. This belief seemed to be corroborated by a prior art disclosure indicating the need for a light hydrocarbon diluent, such as hexane, to eliminate entrainment of xylene (0.89 g./cc. at 20° C.) in an HF layer during meta-xylene extraction. Accordingly, Run Nos. 22–29 and 31 were conducted employing hexane as part of the charge. As evident from Table III, these runs indicate that 1,3,5-chloroxylene can be selectively removed from a mixture of its isomers in an HF-BF$_3$ system with hexane as a diluent. The selectivity is essentially independent of pressure and temperature (Run Nos. 22–26) and the absence, presence, composition and proportion of the chlorotoluene added (Run Nos. 26, 27, 28 and 29, respectively). The 1,3,5-chloroxylene content of the mixture was elevated from about 23% in the charge to about 80% in the extract. In all these runs the liquid HF layer was lowest in the reactor, the hexane solution of uncomplexed chloroxylene being less dense.

Upon further experimentation, it was discovered that the light hydrocarbon diluent was not a necessary part of the system, and that good selectivity could be attained without hexane in the system as long as the extraction was carried out above a certain minimum temperature. The critical lower temperature was found to be that at which the liquid HF and chloroaromatic layers undergo an inversion of position. At lower temperatures, the HF layer assumes the lowest position within the reactor and selectivity is poor; as the temperature is raised the HF layer becomes the uppermost liquid layer and good selectivity is attained. In this regard, extractions carried out at −9° C. and −12° C. (Run Nos. 22–26) and the absence, respectively) with HF as the bottom layer resulted in poor selectivity, while extractions carried out at 22° C. and 26° C. (Run Nos. 33 and 34, respectively) with HF as the upper layer resulted in selectivity almost as good as that when hexane was added. At an even higher temperature, i.e., at 80° C. (Run No. 34), the selectivity actually surpassed that attained with added hexane.

With reference to Table III, it should be noted that two sources of six isomer chloroxylene mixtures were used. These sources are designated as Type A and Type B, respectively. The type A runs employed a mixture prepared by an HF-BF$_3$ chloroxylene isomerization. The resulting isomers were purified by distillation and characterized by gas chromatography. The type B runs utilized a mixture prepared by a 1 hour, 85° C., HF-BF$_3$ isomerization of 1,2,5-chloroxylene just prior to the extraction in the same reactor. Thus, isomerization and extraction were conducted in successive operations utilizing a single charge. A comparison between Run Nos. 30 and 33 indicates that the chloroxylene isomer distribution obtained in a Type A run is substantially identical to that obtained in a Type B run.

As clearly illustrated in Table IV, the temperature at which the HF layer assumes the uppermost position in the reaction vessel is dependent upon the composition of the charge (Run Nos. 35–38). Thus, while the HF layer inversion takes place at about 17±3° C. (Run No. 35) when the molar ratios of chlorotoluene, HF and $BF_3$ to chloroxylene are relatively high, inversion takes place at increasingly higher temperatures as these ratios decrease.

It is to be understood that the above-described embodiments are simply illustrative of the principles of the present invention and that various other modifications and changes may be devised by those skilled in the art which will embody the principles of the invention and fall within the spirit and scope thereof.

We claim:

1. A process for extracting 1,3,5-chloroxylene from a mixture comprising liquid HF, $BF_3$ and a chloroxylene charge comprising 1,3,5-chloroxylene and at least one other chloroxylene isomer and optionally chlorotoluene the molar ratio of HF to $BF_3$ being from about 100:1 to abut 1:1 and the molar ratio of combined HF and $BF_3$ to said chloroxylene charge from about 300:1 to about 1:1, which comprises maintaining said mixture at a temperature of about 0° to about 150° C. and a pressure of about 15 to about 1200 pounds per square inch for about 0.1 to about one hour, resulting in an upper liquid HF layer containing 1,3,5-chloroxylene, HF and $BF_3$ and a lower layer containing said other chloroxylene isomer, separating said two layers from each other and thereafter separating 1,3,5-chloroxylene from said upper layer.

2. The process of claim 1 wherein the molar ratio of HF to $BF_3$ is from about 10:1 to about 2:1, the molar ratio of combined HF and $BF_3$ to said chloroxylene charge is from about 50:1 to about 1:1, the temperature is from about 10° to about 100° C., the pressure from about 100 to about 800 pounds per square inch.

3. The process of claim 1 wherein chlorotoluene is added to the mixture being treated in an amount so that the molar ratio of chlorotoluene to 1,3,5-chloroxylene and the isomers thereof is from about 0.5:1 to about 10:1.

4. The process of claim 2 wherein chlorotoluene is added to the mixture being treated in an amount so that the molar ratio of chlorotoluene to 1,3,5-chloroxylene and the isomers thereof is from about 2:1 to about 5:1.

References Cited

UNITED STATES PATENTS

| | | | |
|---|---|---|---|
| 2,727,075 | 12/1955 | Mattano | 260—650 R |
| 2,819,321 | 1/1958 | Pray | 260—650 R |
| 2,881,224 | 4/1959 | McCaulay et al. | 260—650 R |

HOWARD T. MARS, Primary Examiner

PO-1050
(5/69)

UNITED STATES PATENT OFFICE
CERTIFICATE OF CORRECTION

Patent No. 3,641,168          Dated February 8, 1972

Inventor(s)   John D. Bacha and Charles M. Selwitz

It is certified that error appears in the above-identified patent and that said Letters Patent are hereby corrected as shown below:

Column 3, Table I, last column of Run No. 1, "6." should be "6.3".

Column 3, Table I, last column of Run No. 2, "6.3" should be "6.1".

Column 3, Table I, last column of Run No. 3, "5.1" should be "5.4".

Column 3, Table I, last column of Run No. 4, "5.4" should be "5.3".

Column 3, Table I, last column of Run No. 5, "4.3" should be "4.1".

Column 3, Table I, Run No. 9, under the heading "1,2,5-", "26.6" should be "26.9".

Column 3, Table I, last column of Run No. 8, "2.1" should be "2.7".

Column 3, Table I, last column of Run No. 9, "6.7" should be "6.2".

Column 3, Table I, last column of Run No. 10, "5.2" should be "5.5".

Column 3, Table I, last column of Run No. 11, "5.5" should be "5.8".

Column 3, Table I, Footnote 4 should read "o/m/p:63/30/7".

Column 6, Table III, last column of Run No. 27, ".3" should be "8.3"

PO-1050
(5/69)

UNITED STATES PATENT OFFICE
CERTIFICATE OF CORRECTION

Patent No. 3,641,168      Dated February 8, 1972

Inventor(s) John D. Bacha and Charles M. Selwitz

It is certified that error appears in the above-identified patent and that said Letters Patent are hereby corrected as shown below:

Column 7, Run No. 35, under the heading "126-", "14.3" should be "15.3".

Column 9, line 24, after "charge" please insert "being".

Sheet 2 of 2

Signed and sealed this 20th day of June 1972.

(SEAL)
Attest:

EDWARD M. FLETCHER, JR.
Attesting Officer

ROBERT GOTTSCHALK
Commissioner of Patents